United States Patent [19]
Takahashi

[11] Patent Number: 6,032,096
[45] Date of Patent: Feb. 29, 2000

[54] SYSTEM AND METHOD FOR CONTROLLING RUNNING CHARACTERISTICS OF VEHICLE HAVING AUTOMATIC TRANSMISSION

[75] Inventor: Hiroshi Takahashi, Kanagawa-ken, Japan

[73] Assignee: Nissan Motor Co., Ltd., Yokohama, Japan

[21] Appl. No.: 07/584,935

[22] Filed: Sep. 19, 1990

[30] Foreign Application Priority Data

Sep. 21, 1989 [JP] Japan ..................................... 1-246153

[51] Int. Cl.$^7$ .................................................... G06F 17/00
[52] U.S. Cl. ............................ 701/55; 477/115; 477/121; 477/901
[58] Field of Search ........................... 74/866; 364/424.1; 701/55; 477/115, 121, 901

[56] References Cited

U.S. PATENT DOCUMENTS

| | | | |
|---|---|---|---|
| 4,353,272 | 10/1982 | Schneider et al. | 477/43 |
| 4,466,521 | 8/1984 | Hattori et al. | 74/866 X |
| 4,658,360 | 4/1987 | Osanai et al. | 74/866 X |
| 4,679,145 | 7/1987 | Beeck et al. | 701/51 |
| 4,732,055 | 3/1988 | Tateno et al. | 74/866 |
| 4,823,643 | 4/1989 | Koshizawa | 74/866 |

FOREIGN PATENT DOCUMENTS 62-180153 8/1987 Japan .
63-28741 2/1988 Japan .
63-111350 5/1988 Japan .

*Primary Examiner*—Allan D. Herrmann
*Assistant Examiner*—Ryan W. Massey
*Attorney, Agent, or Firm*—Foley & Lardner

[57] ABSTRACT

A system and method for controlling a running characteristic of a vehicle having an automatic transmission are disclosed in which when a vehicle running condition is changed and a running mode is transferred into a different running mode, the running mode is not directly transferred from the present running mode to a target running mode but is transferred to a transitional running mode which gradually approaches the target running mode. In this state, a control unit determines whether a change rate of the driver's operation for a predetermined time is large or small, i.e., whether the driver drives the vehicle without a feeling of discomfort due to the changed running mode. If the change rate is large, the control unit determines that the driving condition is not preferable, the transfer of the running characteristic from the transitional running mode to the target running mode is inhibited or returned to the original running mode. If the change rate is small, the running mode is transferred from the transitional running mode to the target running mode. Therefore, the vehicle runs under an optimum running characterisitc corresponding to the change in the running condition.

10 Claims, 8 Drawing Sheets ves in respective running modes.

SYSTEM AND METHOD FOR CONTROLLING RUNNING CHARACTERISTICS OF VEHICLE HAVING AUTOMATIC TRANSMISSION

BACKGROUND OF THE INVENTION (1) Field of the Invention

The present invention relates to a system and method for automatically changing a running characteristic of a vehicle, having an automatic transmission, according to a driving characteristic of a vehicle driver or according to a running environment.

(2) Background Art

To change a running characteristic (mode) of a vehicle, various types of systems have been proposed in which, e.g., several kinds of shift patterns for an automatic transmission are set and one of the shift patterns is selected according to a running condition and so on so that a gear speed range of the automatic transmission is shifted in accordance with respective optimum shift patterns for a street run, freeway run, or ascending/decending slope run.

A Japanese Patent Application First Publication (Unexamined) No. Showa 63-28741, published on Feb. 6, 1988, exemplifies a previously proposed system for controlling a gear shift range of an automatic transmission.

In the previously proposed gear shift range controlling system, an acceleration of the vehicle is derived from a differential value of a vehicle speed, and an absolute value of the acceleration is integrated to determine whether the vehicle is running on a street or on an ascending slope.

A Japanese Patent Application First Publication (Unexamined) Showa 62-180153, published on Aug. 7, 1987, exemplifies a previously proposed method for determining whether the vehicle having the automatic transmission is running on an ascending slope.

In the previously proposed method, the vehicle is determined to be running on an ascending slope when the vehicle speed is reduced and the gear speed range is shifted from a higher gear range to a lower gear range although engine output torque is maintained above a constant value.

Then, when the previously proposed method determines that the running condition is transferred to a particular state different from the previous shift pattern, a change in the shift pattern is immediately executed to change the running mode.

However, since the vehicle driver usually does not perceive that the running mode has been changed, vechicular behavior which reverses an expectation of the driver may occur as he or she may operate the vehicle assuming that the running mode is the same as before the change of shift pattern. Therefore, the driver may experience an unpleasant feeling while driving.

In addition, even if the driver predicts the change of shift pattern, the same unpleasant feeling is experienced for a duration of time during which the driver becomes accustomed to the new pattern. Since the feeling is different for each driver, this is a perplexing problem in drive operation which impairs enjoyment of the driving experience.

In addition to the case of shift pattern changing, the above applies equally well to corresponding relationships of an opening angle of an engine throttle valve with respect to a depression angle of an accelerator and of a mixture ratio of air fuel mixture with respect to the depression angle of the accelerator and to a case where a characteristic of the generated output of the engine such as ignition timing is changed according to running conditions.

SUMMARY OF THE INVENTION

It is, therefore, an object of the present invention to provide a system and method for controlling a running characteristic of a vehicle having an automatic transmission in which, during a change in the running mode, the gear shift pattern is once transferred into an intermediate running mode, the change of running mode to a new shift pattern being completed or cancelled according to a reaction of a vehicle driver.

The above-described object can be achieved by providing a system for controlling a running characteristic of a vehicle, comprising: a) first means for setting a plurality of different running characteristics; b) second means for determining a vehicular current running condition; c) third means for selecting one running characteristic on the basis of said determined running condition; d) fourth means for setting at least one transitional running characteristic which provides an intermediate running characteristic between the presently selected running characteristic and a target running characteristic to be next selected; e) fifth means for temporarily transferring the running characteristic from the presently selected running characteristic to the transitional running characteristic before the running characteristic is transferred from the presently selected running characteristic to the target running characteristic; f) sixth means for determining a change rate of a driving operation when the running charactersitic is transferred and determining whether the transfer of the running characteristic is appropriate according to a result of determination of the change rate; and g) seventh means for carrying out the transfer of the running characteristic to said target running characteristic according to the result of determination of whether the transfer of the running characteristic is appropriate.

The above-described object can also be achieved by providing a method for controlling a running characteristic of a vehicle, comprising the steps of: a) setting a plurality of different running characteristics; b) determining a current running condition; c) selecting one running characteristic on the basis of the determined running condition; d) setting at least one transitional running characteristic which provides an intermediate running characteristic between the presently selected running characteristic and a target running characteristic to be next selected; e) temporarily transferring the running characteristic from the presently selected running characteristic to the transitional running characteristic before the running characteristic is transferred from the presently selected running characteristic to the target running characteristic; f) determining a change rate of a driving operation when the running charactersitic is transferred and determining whether the transfer of the running characteristic is appropriate according to a result of determination of the change rate; and g) carrying out the transfer of the running characteristic according to the result of determination of whether the transfer of the running characteristic is appropriate.

DETAILED DESCRIPTION OF THE PREFERRED EMBODIMENT

Reference will hereinafter be made to the drawings in order to facilitate a better understanding of the present invention.

Figure 1:
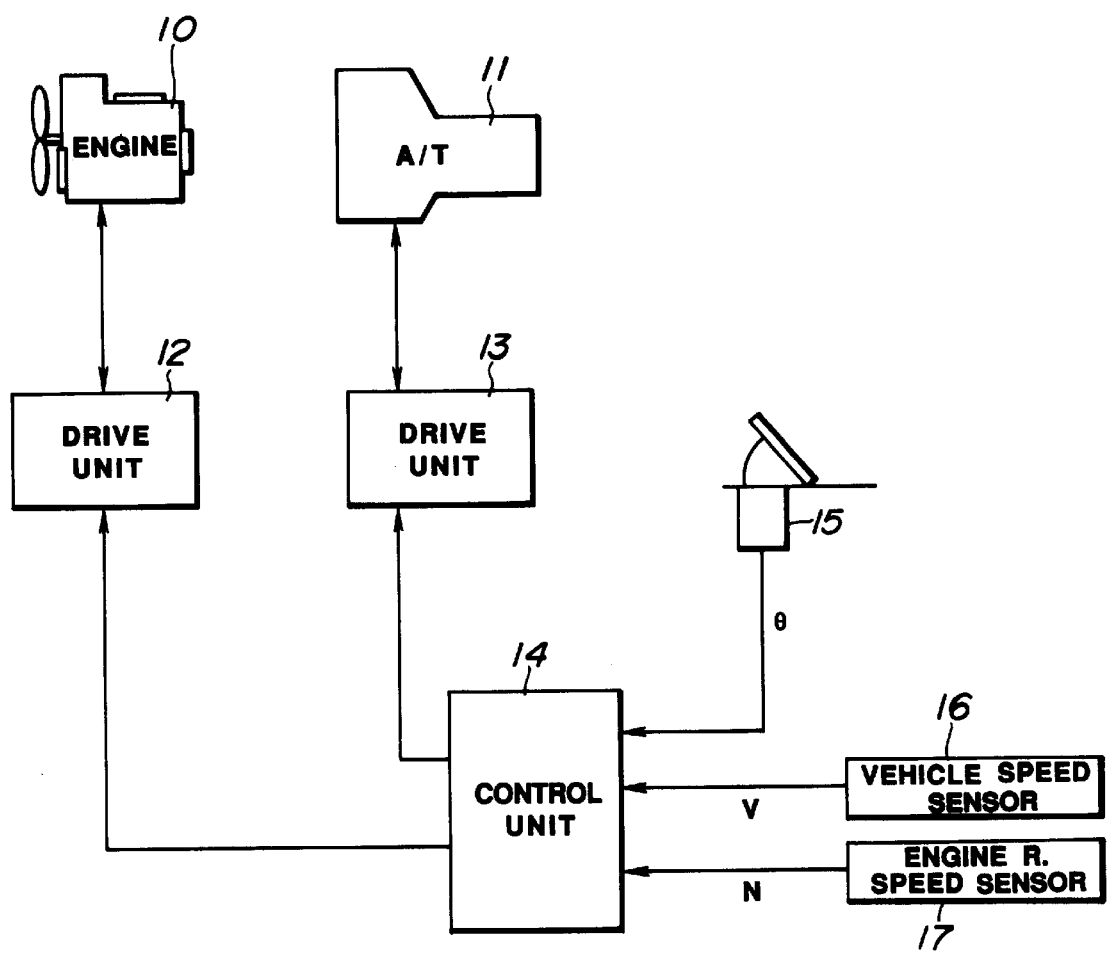
FIG. 1 is a schematic circuit block diagram of a system for controlling a running characteristic of a vehicle having an automatic transmission in a preferred embodiment according to the present invention.

FIG. 1 shows a circuit block diagram of a system for controlling a running characteristic of a vehicle having an automatic transmission.

In FIG. 1 an engine 10 and automatic transmission 11 are linked together and installed in a vehicle. A drive unit 12 controls an ignition timing and opening angle of a throttle valve (intake air quantity) according to driving conditions. A drive unit 13 controls a gear shift of the automatic transmission 11 according to the driving conditions. These drive units 12, 13 are controlled by means of a control unit 14 constituted by a microcomputer.

The control unit 14 recieves various kinds of signals denoting a driving state of a vehicle, running condition of the vehicle, and driving operations by a driver. An acceleration sensor 15 detects an opening angle (depression angle) of an accelerator. A vehicle speed sensor 16 detects vehicle speed. An engine revolutional speed sensor 17 detects engine revolutional speed.

The control unit 14 continuously selects an optimum ignition timing characteristic (mode) which corresponds to the instantaneous running condition from a table of predetermined control characteristics depending on the current ignition timing.

The control unit 14 furthermore continuously selects from a table of characteristic modes representing relationships between a present accelerator angle and an optimum throttle valve opening angle. In other words, an interlocked relationship between a given accelerator angle and a corresponding throttle valve angle is not present, but rather the control unit freely sets the characteristic mode so as to provide an optimum throttle valve opening angle with respect to the present opening angle of the accelerator valve, which is controlled by means of e.g., a motor.

Similarly, the control unit 14, selects an optimum shift pattern characteristic for the automatic transmission (A/T 11) according to the instantaneous running conditions.

Figure 3:
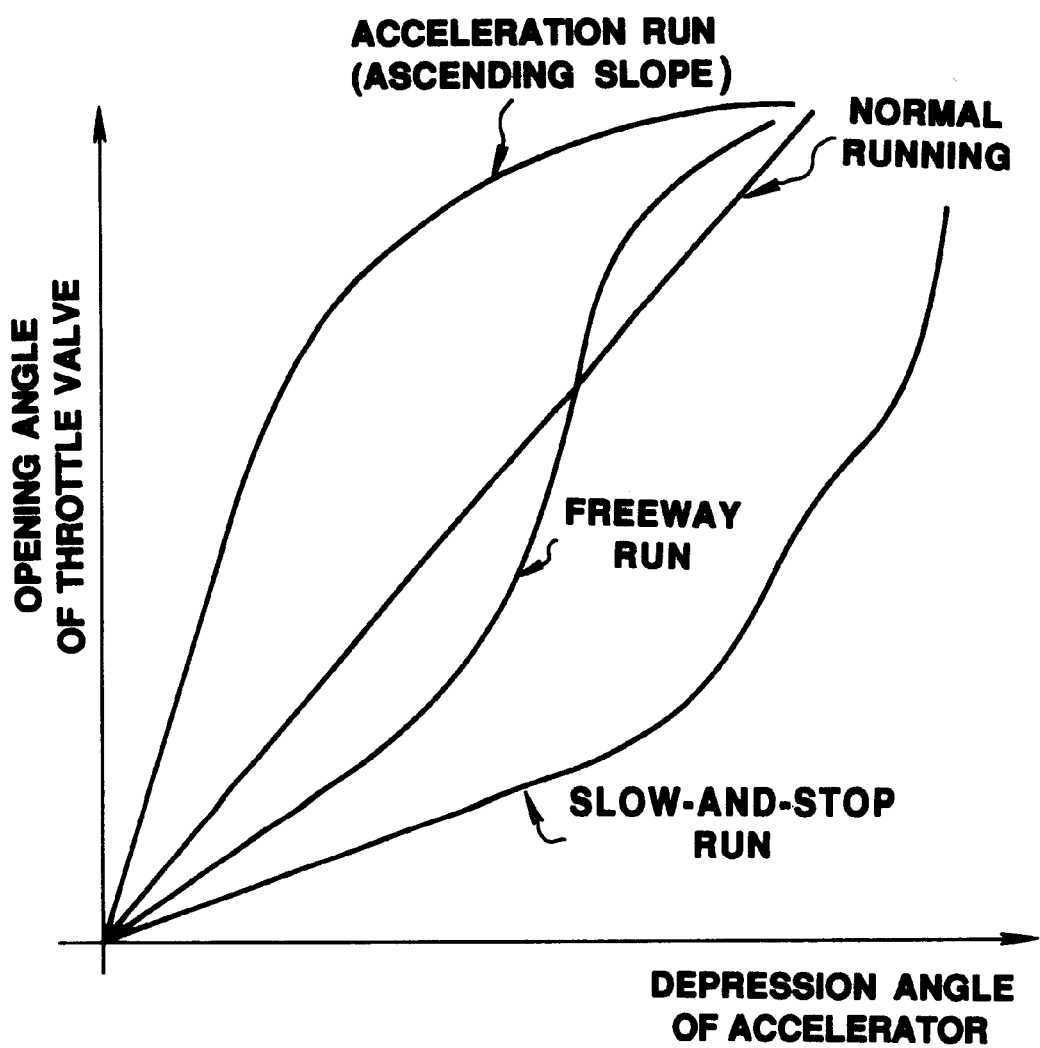
FIG. 3 is a characteristic graph representing relationships between opening angles of an accelerator and engine throttle valves in respective running modes.
Figure 4:
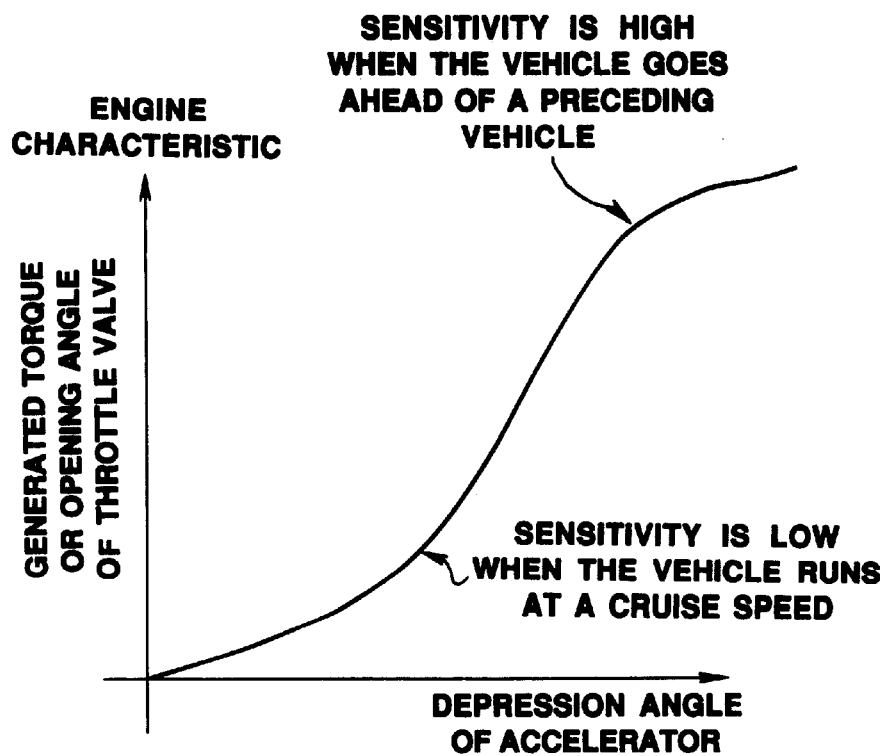
FIGS. 4(A), 4(B), 5(A) and 5(B) are graphs showing corresponding relationships between opening angles of an accelerator and throttle valve and a gear shift characteristic of the automatic transmission shown in FIG. 1 during freeway running and running in city traffic, respectively.
Figure 4:
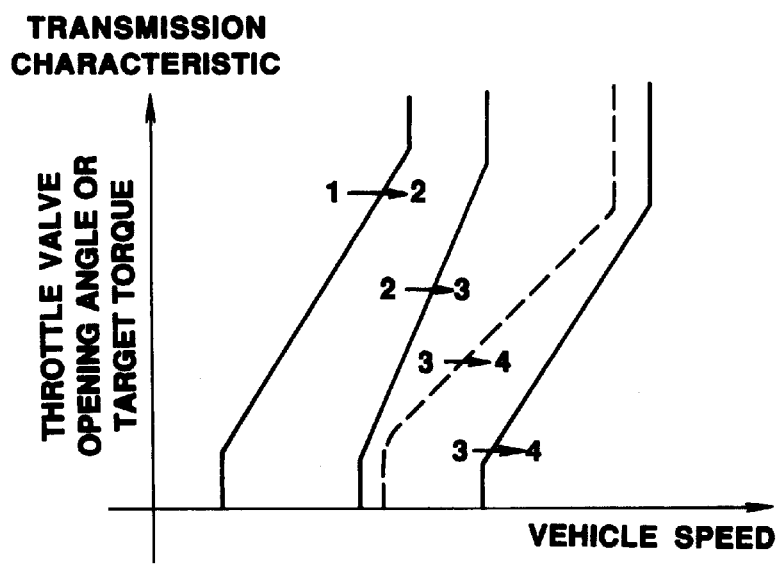
Figure 5:
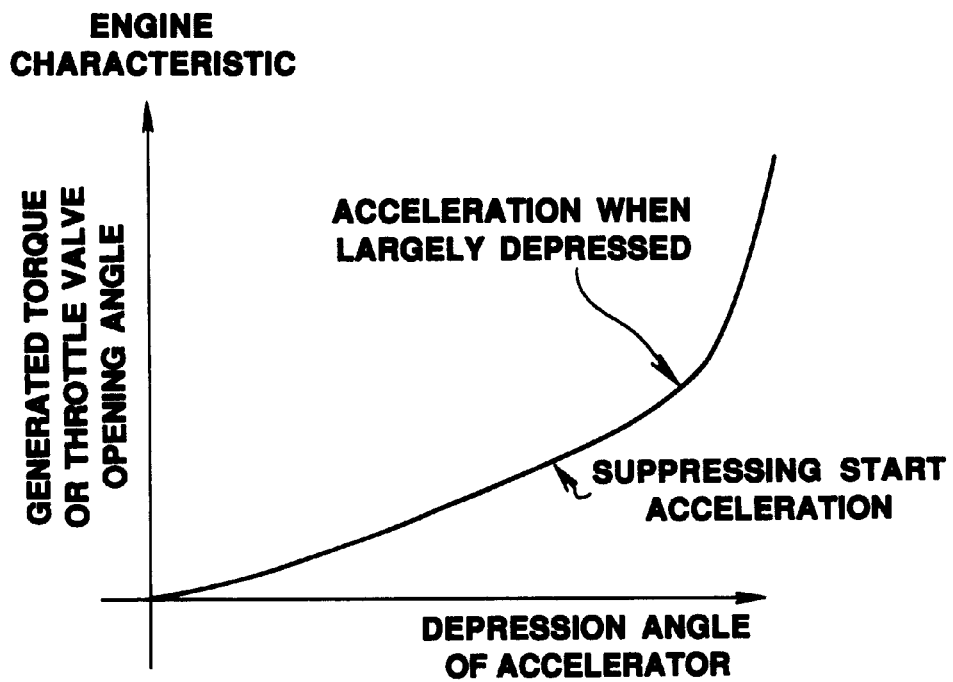
Figure 5:
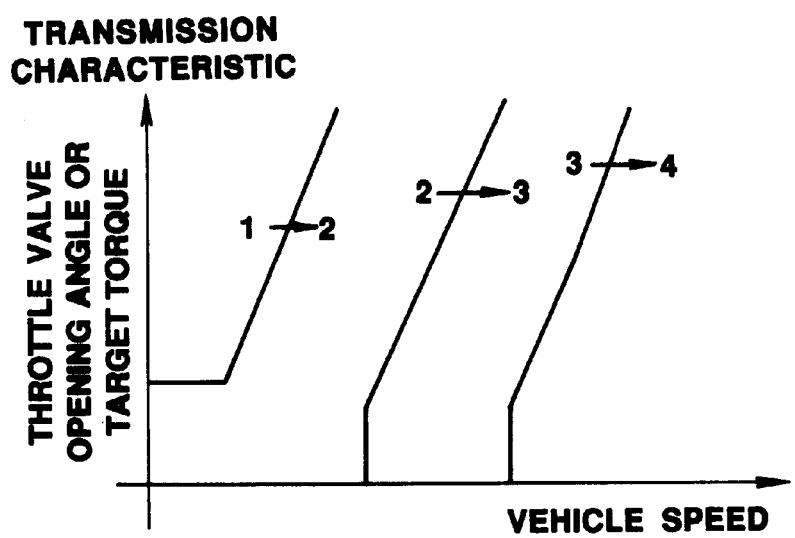

FIG. 3 shows an example of the correlation of the opening angle of the throttle valve with respect to that of the accelerator. During normal vehicle running (i.e. uncrowded suburban street conditions), a 1:1 relationship is established. During running on an ascending slope, the accelerator opening angle will be increased as a driver increases engine output to maintain vehicle speed. when an accelerator angle increase without vehicle speed increase is detected by the control unit 14, an opening angle of the throttle valve is quickly increased to produce increased engine output with respect to the accelerator operation. During vehicle operation in city traffic (in this case, the vehicle driver starts and stops more often) or operation on a narrow or cuved road (many speed adjustments are made), the throttle valve is slowly opened to prevent an abrupt change in engine output with respect to a slight change of the depression angle of the accelerator. During vehicle operation on a freeway, during which the depression angle of the accelerator is fairly high, the control unit 14 monitors an increase percentage of the opening angle in this high angle (or high speed) range to determine a driver's desire to pass a preceding vehicle. In this case a shift pattern is selected to downshift from the current gear to provide acceleration to facilitate passing.

FIGS. 4(A) through 5(B) show examples of engine output characteristics of the engine 10 and shift pattern characteristics of the automatic transmision (A/T 11) under freeway and city driving conditions.

A representative shift pattern characteristic of the automatic transmission (A/T 11) includes a shift pattern such that a shift down from a fourth speed range to a third speed range is easily carried out in the area in which the opening angle of the throttle valve is large. In addition, during operation in city conditions, the vehicle can be started from second gear in order to provide smooth and gradual acceleration.

In this way, a running mode which provides optimum running characteristics is continuously selected according to the present running condition of the vehicle.

It is noted that, according to the present invention, when the vehicle is transferred into the optimum running mode, the present running mode is not transferred into the target running mode but is changed to an intermediate transitional running mode such that a gradual transition from the present running mode may be made before transfer to the target running mode. During such a state as described above, the actions of the vehicle driver are deduced by the control unit 14 according to a change percentage of the monitored driving operations. When the change percentage is small, the control unit 14 determines that the driver experiences no feeling of mismatch due to the transitional running mode change and therefore proceeds to transfer the running mode to the subsequent target running mode. On the other hand, if the change in percentage is large, the control unit 14 determines that a feeling of mismatch experienced by the driver is large and the driver is perplexed with the change of running mode and therefore inhibits transfer from the transitional running mode to the target running mode or returns the running mode to the original running mode.

Figure 6:
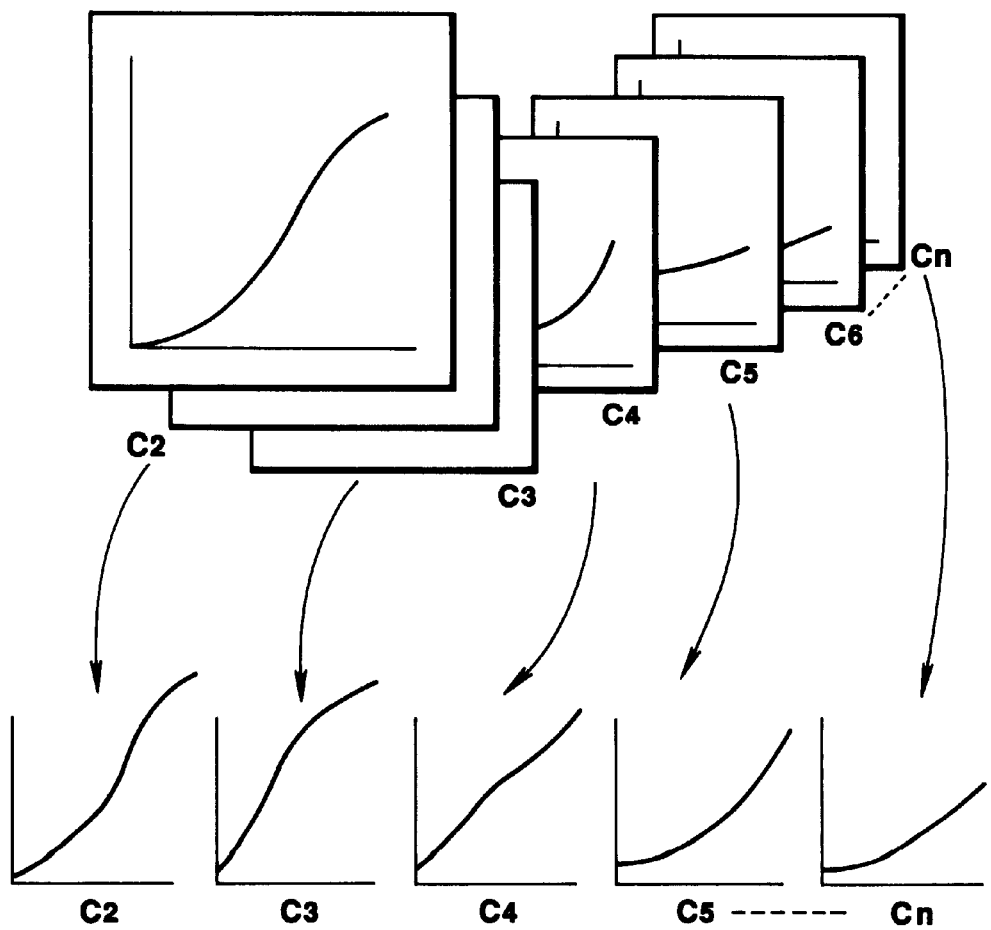
FIG. 6 is an explanatory view representing transitional running mode assumed intermediate to a change in the running mode.
Figure 7:
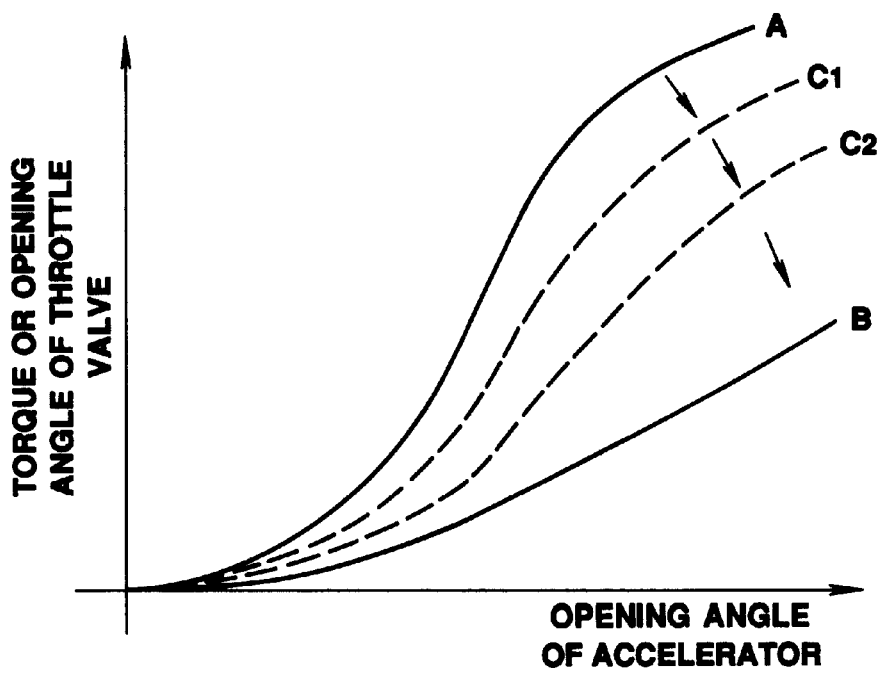
FIGS. 7(A) and 7(B) are explanatory views of a relationship between opening angles of the accelerator and throttle valve in the transitional running mode and a relationship between vehicle speed and a throttle valve opening angle.
Figure 7:
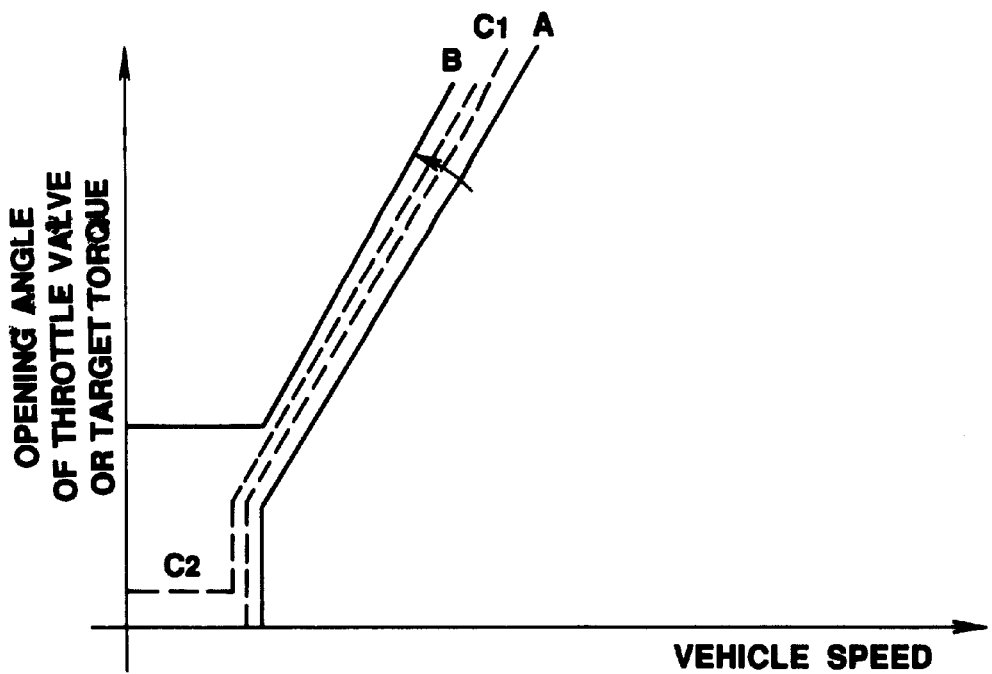

As shown in FIGS. 6 and 7(B), the control unit 14 sets running modes $C_i$ (i=1, 2, 3, - - - , n, $C_1 \approx A$, $C_n \approx B$) having an intermediate characteristic between the characteristics of mode A and mode B.

When the control unit 14 determines a transfer of running mode, the control unit 14 selects a mode $C_1$ most adjacent to the mode A, determining the percentage change in monitored drive operations after a lapse of time set by a timer. When the change percentage is small, the control unit 14 sequentially transfers to the modes $C_2$, $C_3$, etc. When the change percentage is larger than a predetermined value, the mode transfer is inhibited and the mode is returned to the original, i.e., one previous running mode.

For determining the change percentage in drive operation, in the preferred embodiment, the change percentage of the opening angle of the accelerator is monitored.

If the change-over of the running mode is carried out and the vehicle behaves differently from what is expected by the driver, a driver will normally tend to depress or release the accelerator pedal suddenly in reaction to the unexpected vehicle behavior. Hence, in a case where the change percentage of the accelerator operation is marked during a change in the running mode, the driver may be assumed to be perplexed with the change in the running mode. When the change percentage thereof is small, it may be assumed that the driver is not especially anxious due to the change. As a result, stability of drive operation can be maintained even if the running mode is transferred to the subsequent running mode.

In the preferred embodiment, to determine the change percentage of the accelerator, an unbiased variance test of change in the opening angle of the accelerator is performed according to a differential method of statistical processing.

Suppose that a value of y for $x_n = x_o + nh$, $x_n$ being placed at equal intervals, is expressed as $y_n = f(x_n)$ in a given function; $y = f(x)$, delta $y_n = y(n+1) - Y_n$ is defined as a one-order differential value and delta$^2$ $y_n$=delta $y(n+1)$–delta $y_n$ is defined as a two-order differential value.

Suppose that the one-order differential value of the opening angle of the accelerator $\theta$ with respect to a time t, $(0 < t \leq t_o)$ is delta $\theta_i$ and n number of data samplings are to be carried out within the time $t_o$. An unbiased variance value $\delta$ of the one-order differential value of the opening angle of the accelerator in the predetermined time $t_o$ can be expressed as follows:

$$\delta = \left\{ \sum_{i=1}^{n} delta\theta_i^2 - \left( \sum_{i=1}^{n} delta\theta_i \right)^2 / n \right\} / (n-1) \quad (1)$$

Next, an unbiased variance value $\gamma A_1$ in the running mode A and a value $\gamma C_1$ in the transitional running mode $C_i (=C_1)$ are respectively calculated. Then, an unbiased variance ratio f is calculated as follows: $f = \delta C_1 / \delta A$, provided that when $f \leq 1$, $f = \delta A / \delta C_1$—(2).

Then, an F value of, e.g., about 5% of a level of significance is derived from an F-distribution of a degree of freedom (n–1, n–1) according to the technique of unbiased variance testing. The value of F is compared with the above-expressed f. If f>F. the control unit 14 determines that a significant variance difference occurs in the one-order differential value of the accelerator opening angle. If $f \leq F$, less variance occurs.

Figure 8:
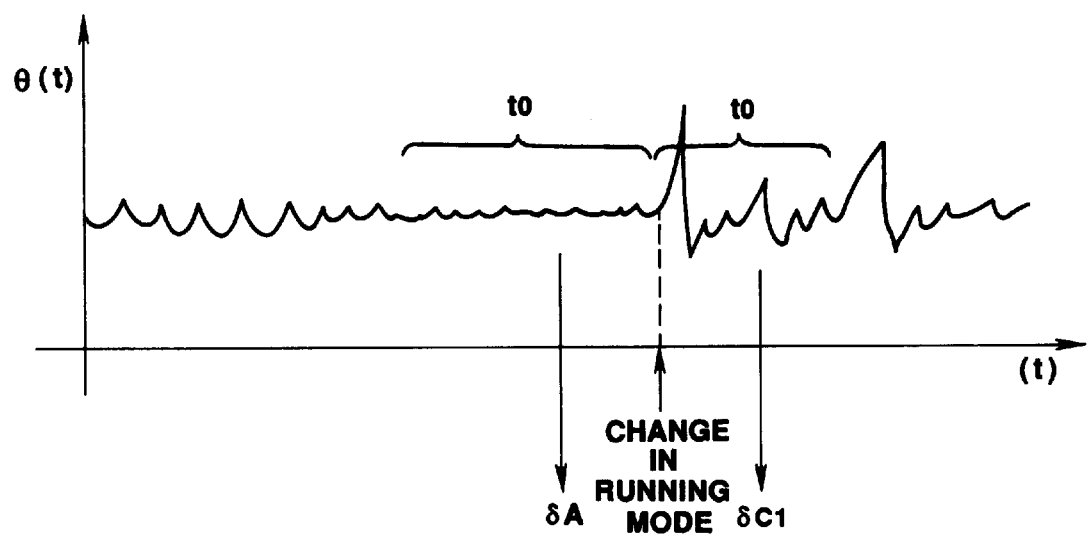
FIG. 8 is an explanatory view representing a first-order differential value of the opening angle of the accelerator which corresponds to a change in time.

FIG. 8 shows a waveform of the change in the one order differential value before and after the change in the running mode.

Since, as shown in FIG. 8, in general, the one order differential value of the opening angle of the accelerator becomes large and large variances occur as the driver does not expect the present running characteristic, the control unit 14 can determine that the change percentage in the drive operation is large depending on the large variance of the one order differential value of the opening angle of the accelerator.

However, if the F value is directly used as a compared value of the f value, there is a possibility that the control unit detects change thereof which is dependent on variance naturally present in a human being. Therefore a value of about 1.5 to 2 times the F value may be adopted as the compared value.

It is noted that as well as deriving the change percentage of the drive operation through statistical processing, a total value of the one order differential values of the opening angle of the accelerator or second order differential values thereof in a predetermined time may alternatively be compared with a predetermined standard value to derive the change percentage in drive operation. In this case, if the total value is larger than the standard value, a frequency of depressions and releases of the accelerator pedal may also be compared such that, if the frequency is high the control unit can determines that the driver is perplexed with the change in the running mode.

Alternatively, an average value A of the one order differential value of the accelerator opening angle per unit of time for a very long period of time (e.g., 60 minutes through 90 minutes), may be compared with the one-order differential values $A_s$ of the accelerator opening angle per unit of time for a very short period of time (e.g., 10 seconds through 20 seconds), immediately after the change in the running mode. In this case, the control unit can determine that the driver is perplexed with the change in the running mode when the resulting value of comparison is large.

Figure 2:
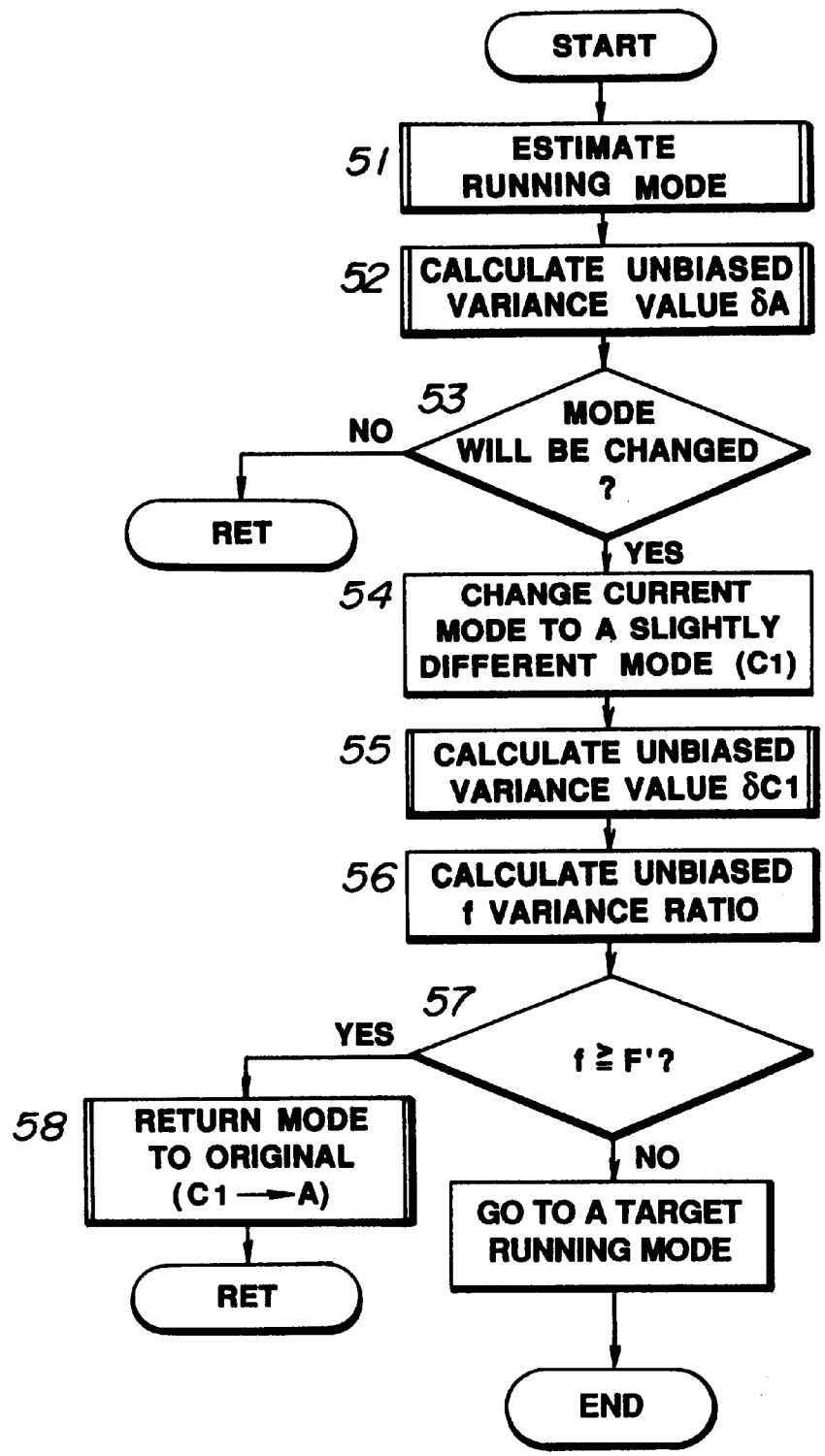
FIG. 2 is an operational flowchart of a control operation of the system shown in FIG. 1.

FIG. 2 shows an operational flowchart that the control unit 14 executes in order to achieve the above-described determination of the driver's adjustment to the running mode during driving operations.

The operation steps shown in FIG. 2 are based on the technique of the unbiased variance test from which the change percentage of the drive operation is derived. The flowchart shown in FIG. 2 is repeated for a unit interval of time.

In steps 51 and 52, the control unit 14 estimates the present running mode A from the input information of the drive unit and/or sensors described above and calculates its unbiased variance value $\delta A$. In the next step 53, the control unit 14 determines whether the running condition is changed into a region in which the previously set running mode is to be changed. It is noted that this determination is based on whether the vehicle is running on a freeway, an ascending slope, in city traffic, or on a suburban road as described above with, e.g., an average vehicle speed, a relationship between the engine revolutional speed and vehicle speed, and relationship between the vehicle speed and opening angle of the accelerator taken into consideration.

If the control unit 14 determines that the running condition is transferred to a state in which the mode A can be changed, the control unit 14 changes from the mode A to the mode $C_1$ slightly different from the present mode which gradually approximates a target running mode. In this states, the control unit 14 calculates the unbiased variance value $\delta C_1$ (steps 54 and 55).

In steps 56 through 58, a ratio between the two unbiased variance values $\delta A$ and $\delta C_1$, i.e., the unbiased variance ratio f is calculated. The calculated variance ratio f is compared with a predetermined value F' several times the value of the F value by means of the F-distribution of the unbiased variance test. If $f \geq F'$, the control unit 14 determines that the driver's feeling of due to the change in the running mode is large and the running mode is returned from $C_1$ to the original mode A.

On the other hand, if f<F', the control unit 14 determines that less feeling of mismatch occurs the routine proceeds to the next step, i.e., to transfer the running mode to the target running mode.

It is noted that the transfer of the running mode is not such that the direct transfer is made from the instantaneous running mode to the target running mode but such that the indirect transfer is once made from the instantaneous running mode to the intermediate transitional running mode, the actual reaction of the driver in this state, i.e., the drive operation of the driver is observed to determine whether the driver is perplexed with the change of the running mode, and, then, the control unit 14 determines whether the subsequent running mode should be transferred according to the result of observation. Therefore, even if a personal idiosyncracy in the driver's operation exists in compatibility to the mode change, the control unit 14 can determine the appropriate changes of the running mode. Consequently, the system for controlling the running characteristic of the vehicle according to the present invention can provide a high adaptability of control from the driver's view point as compared with such a system that, e.g., after the running mode is transferred into the intermediate transitional running mode for a fixed period of time, the running mode is automatically is changed into the target running mode.

It is also be noted that although, in the preferred embodiment, the running mode is returned to the original running mode when the change percentage of the driver's drive operation is large at the time of transfer of the running mode, the transitional running mode may be maintained without returning to the original running mode and the transfer to the target running mode may temporarily be inhibited. In the alternative case, the control unit 14 then transfers the transitional running mode into the target running mode when the change percentage becomes small during run in the transitional running mode.

As described hereinabove, in the system and method for controlling the running characteristic of a vehicle having an automatic transmission, when the running mode is transferred to a running mode different from the present running mode, the running mode is not directly transferred from the present running mode to the target running mode but is transferred to an transitional running mode near the target running mode. In this state, the reaction of the driver is observed to determine whether the change percentage per unit of time of driver operation is large. If the change percentage is large and it is not preferable for the vehicle driving, the transfer from the transitional running mode to the target running mode is once inhibited or returned to the original running mode. On the other hand, when the change percentage is small and the driver does not feel mismatch with the change in the running mode, the running mode is transferred to the target running mode. Since vehicle run is controlled under the optimum running mode which corresponds to the change in the running condition, change in the running characteristic without a feeling of mismatch can be achieved. In addition, the personal difference of the mismatch feeling along with the change in the running mode can be adaptively abosorbed.

It will fully be appreciated by those skilled in the art that the foregoing description has been made in terms of the preferred embodiment and various changes and modifications may be made without departing from the scope of the present invention which is to be defined by the appended claims.

What is claimed is:
1. A system for controlling a running characteristic of a vehicle, comprising:
 a) first means for setting a plurality of different running characteristics of the vehicle;
 b) second means for determining a vehicular current running condition;
 c) third means for selecting a first running characteristic of the set running characteristics on the basis of the determined running condition;
 d) fourth means for setting at least one transitional running characteristic which provides an intermediate running characteristic between the presently selected running characteristic and a target running characteristic;
 e) fifth means for temporarily transferring the running characteristic from the first running characteristic to the transitional running characteristic;
 f) sixth means for determining a change rate of a driving operation when the running characteristic is transferred and for determining whether the transfer of the running characteristic is appropriate according to a result of the determination of the change rate; and
 g) seventh means for carrying out the transfer of the running characteristic from the transitional running characteristic to the target running characteristic according to the result of the determination of whether the transfer of the running characteristic is appropriate.

2. A system as set forth in claim 1, wherein the seventh means carries out the transfer of the running characteristic from the transitional running characteristic to the target running characteristic when the change rate is relatively small and halts the transfer of the running characteristic to the target running characteristic when the change rate ischaracteristic relatively large.

3. A system as set forth in claim 2, wherein the seventh means returns the transitional running characteristic to the first running characteristic when the change rate is relatively large.

4. A system as set forth in claim 3, further comprising an accelerator, and wherein the sixth means comprises eighth means for detecting a depression angle of the accelerator and ninth means for determining a change rate of the depression angle of the accelerator to determine the change rate of the driving operation.

5. A system as set forth in claim 4, wherein the ninth means comprises tenth means for calculating unbiased variance values of one-order differential values of the depression angle of the accelerator for a predetermined period of time when the running characteristic is the first running characteristic and when the running characteristic is the transitional running characteristic, for calculating an unbiased variance ratio f between the two unbiased variance values, calculating a value F of approximately 5% of a level of significance from an F-distribution of a degree of freedom (n−1, n−1) through an unbiased variance test, and for comparing the values of f and F.

6. A system as set forth in claim 4, wherein the ninth means comprises tenth means for calculating a total value of either one-order or second-order differential values of the depression angle of the accelerator within a predetermined period of time and for comparing the total value with a predetermined value.

7. A system as set forth in claim 4, wherein the ninth means comprises tenth means for calculating an average value of one-order differential values of the depression angle of the accerelator per unit time for a predetermined period of time, for calculating one-order differential values thereof per unit of time immediately after the running characteristic is transferred, and for comparing the average value with the one-order differential value.

8. A system as set forth in claim 1, wherein the second means determines whether the vehicle runs on one of a freeway, in city traffic, on an ascending slope, and a suburban road according to at least one of an average speed of the vehicle, a relationship between an engine revolutional speed and a vehicle speed, and a relationship between an opening angle of the accelerator and the vehicle speed.

9. A system for controlling a running characteristic of a vehicle, comprising:
 a) first means for setting a plurality of different running characteristics of the vehicle;
 b) second means for determining a current running condition of the vehicle;
 c) third means for selecting a running characteristic of the set running characteristics on the basis of the determined running condition;
 d) fourth means for setting at least one transitional running characteristic which provides an intermediate running characteristic between the presently selected running characteristic and a target running characteristic;
 e) fifth means for temporarily transferring the running characteristic from the presently selected running characteristic to the transitional running characteristic;
 f) sixth means for determining a change rate of a driving operation when the running characteristic is transferred and for determining whether the transfer of the running characteristic is appropriate according to a result of the determination of the change rate; and
 g) seventh means for carrying out the transfer of the running characteristic from the transitional running characteristic to the target running characteristic when the change rate is relatively small and for halting the change of the running characteristic or for returning the running characteristic to the first running characteristic when the change rate is relatively large.

10. A method for controlling a running characteristic of a vehicle, comprising the steps of:
 a) setting a plurality of different running characteristics of the vehicle;
 b) determining a current running condition of the vehicle;
 c) selecting one of the set running characteristics on the basis of the determined running condition;
 d) setting at least one transitional running characteristic which provides an intermediate running characteristic between the presently selected running characteristic and a target running characteristic;
 e) temporarily transferring the running characteristic from the presently selected running characteristic to the transitional running characteristic;
 f) determining a change rate of a driving operation when the running characteristic is transferred and determining whether the transfer of the running characteristic is appropriate according to a result of the determination of the change rate; and
 g) carrying out the transfer of the running characteristic according to the result of the determination of whether the transfer of the running characteristic is appropriate.

* * * * *